United States Patent [19]

Chesner

[11] 4,020,184
[45] Apr. 26, 1977

[54] METHOD OF MAKING PIZZA BREAD ANALOG

[76] Inventor: Jack B. Chesner, 2747 Alice Terrace, Union, N.J. 07083

[22] Filed: Jan. 2, 1976

[21] Appl. No.: 646,348

[52] U.S. Cl. .................................. 426/19; 426/94; 426/302

[51] Int. Cl.² .......................................... A21D 8/04

[58] Field of Search ............. 426/94, 138, 19, 302, 426/307

[56] References Cited

UNITED STATES PATENTS

| | | | |
|---|---|---|---|
| 2,608,485 | 8/1952 | Ryder | 426/138 |
| 2,668,117 | 2/1954 | Bucci | 426/62 X |
| 2,774,316 | 12/1956 | Daino | 426/496 UX |
| 3,667,963 | 6/1972 | Ratter et al. | 426/94 X |
| 3,879,564 | 4/1975 | Cocozzella | 426/94 X |

FOREIGN PATENTS OR APPLICATIONS

| | | | |
|---|---|---|---|
| 600,072 | 6/1960 | Canada | 426/138 |

OTHER PUBLICATIONS

De Gouy "The Bread Tray" 1944 Greenberg Publisher, New York, pp. 358–359.

*Primary Examiner*—Raymond N. Jones
*Attorney, Agent, or Firm*—Natter & Natter

[57] ABSTRACT

A pizza ersatz in the form of a bread food product and process therefor. A dough is prepared using a tomato based formula providing pizza flavor ingredients for homogeneous distribution throughout a soft textured baked bread loaf. A charge of stabilized flavor intensifier is inserted into a preformed incision in the dough surface for limited migration during baking. The baking procedure also includes the introduction of a flowable cheese composition having a viscous consistency for containment within a confined area on the bread surface.

7 Claims, 8 Drawing Figures

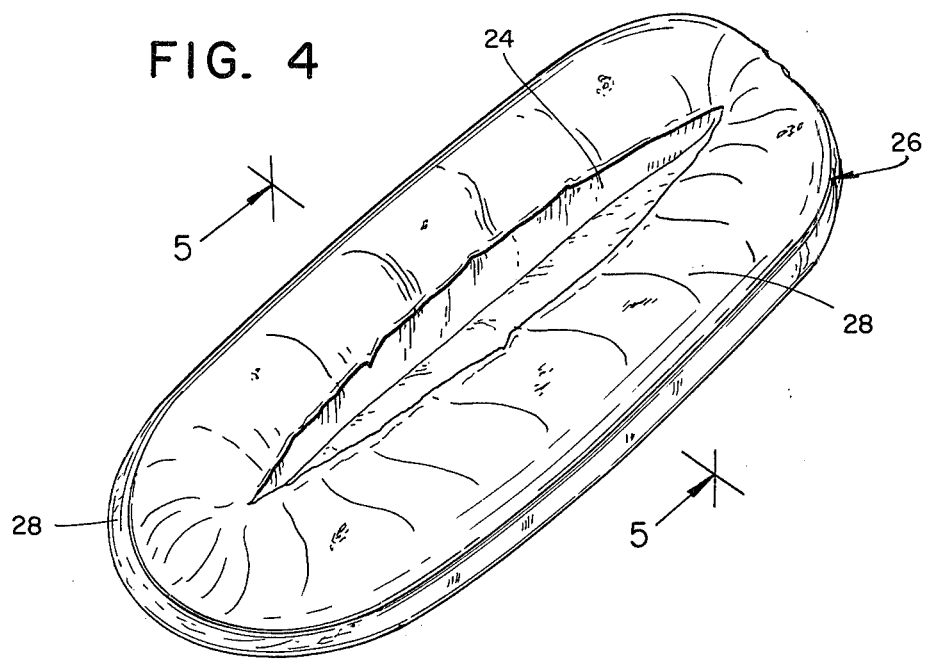
FIG. 4
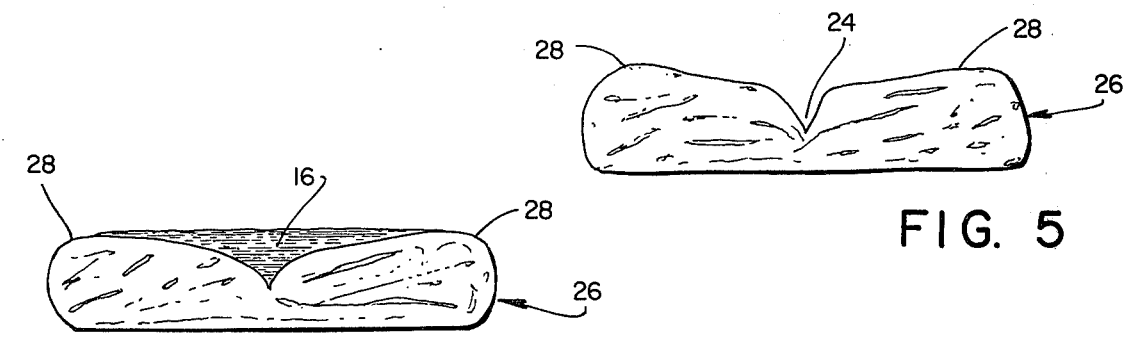
FIG. 5
FIG. 6
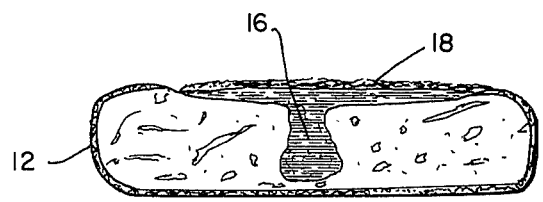
FIG. 7
FIG. 8
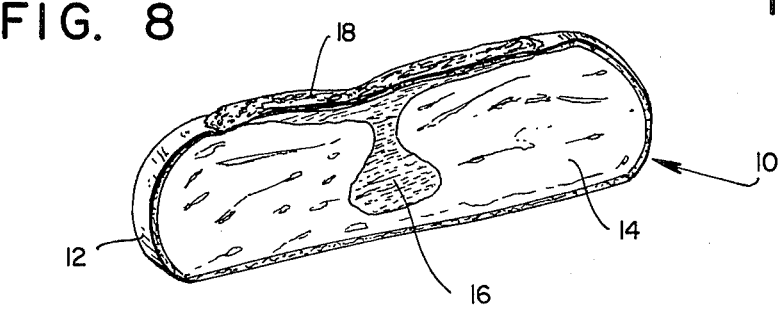

METHOD OF MAKING PIZZA BREAD ANALOG

BACKGROUND OF THE INVENTION

1. Field of the Invention

This invention is concerned with a food product and process and especially with a pizza bread analog.

In particular, the food product and method of this invention relates to a baking procedure for preparing an edible pizza ersatz product in bread form.

2. Description of the Prior Art

Consumers of fast food snacks have expressed favorable acceptance of Italian cuisine specialties such as pizza pies and similarly related products. The demand for such food items and in particular for pizza products is generally met by providing pizza in a freshly prepared state for consumption, preferably while still hot. Additionally, pizza products have been merchandised in a frozen state or the constituent ingredients packaged for home preparation.

Although conventional pizza food products have been well recognized as popular snack foods, there has been relatively no significant advancement with regard to the basic form of the intrinsic product or improvements therein to develop same into a gourmet food item. Further, the incorporation of a pizza taste or flavoring into other food products has not been satisfactorily achieved with regard to a bread food product. It is a purpose thereof of this invention to overcome such disadvantages of the prior art and to expand upon the traditional pizza food items by providing a pizza bread.

The prior art shows some variations as to pizza forms, such as a covered pizza (as noted in U.S. Pat. No. 3,615,678) wherein a tomato based sauce is placed within a pocket formed between two dough layers and thus baked. Also reference is made in U.S. Pat. No. 3,667,963 to a method of making a pizza food product by cutting a prebaked roll in half and applying a pizza sauce, after which the roll with the sauce is then baked.

A problem with the foregoing and other prior art pizza foods is that they require heating prior to eating in order to bring out the flavor and effect a palatable taste. Also, these pizza products as manufactured in the prior art are quite perishable in nature and can often only be stored for long periods when in a frozen state.

The instant invention, in contrast, not only provides a wholesome, nutritious pizzalike product having superior taste qualities, but also has a reasonable shelf storage life and can be consumed either at room temperature or after heating. In addition, the food product as produced in accordance with this invention is suitable for a wide variety of food uses. It can form the basis for a meal in and of itself. It can also be used as a snack. Also, it may be used to supplement other food dishes or served in conjunction with buffets as a gourmet type food. The preferred embodiment of the food product of the present invention is shown in the form of a bread loaf which can be eaten without any special preparation. The bread product, however, can be heated prior to eating or sliced and toasted. In addition, it can be used to form the basis for sandwiches such as meatball sandwiches or food spreads can be placed on slices of the bread.

A feature of this invention therefore is that the bread food as produced combines pizza flavoring ingredients in a bread product and is completely compatible with a wide variety of culinary usage while providing a distinctive pizza taste. In fact, the food product of this invention can serve as a readily available "instant pizza".

BRIEF SUMMARY OF THE INVENTION

Briefly, the food product and process of this invention are directed to the preparation of a pizza analog in bread form. The method encompasses the formation of a bread loaf, roll, bagel, bun or other similar food comfit. The bread product provides a pizza ersatz formed by combining selected pizza flavor ingredients during the dough mixing, proofing and baking stages, and the ingredients are fully integrated into the finished baked product.

In accordance with the invention a dough mixture is prepared using a tomato based formula which is thoroughly incorporated into the final baked product and contributes to the unusual palate pleasing pizza flavor as produced within a soft textured bread. Additional flavor ingredients are introduced by way of a charge of stabilized flavor intensifier which is inserted into a preformed incision in the proofed dough prior to baking. This intensifier contains preferably a cornstarch stabilizer for limiting the migration within the dough during the baking operation and thus providing an included area within the baked product a high concentration of the flavor intensifier. Another feature of this process is the surface application of a flowable cheese composition during the baking stage for further accentuating the taste sensation in the final baked product.

The procedure of this invention also advantageously permits the dough to be scaled to selected shapes and sizes prior to baking. Thus, the pizza food product is adaptable to be molded into other forms of bread products.

The pizza bread food product of this invention can thus not only be used as a conventional bread substitute but also can be served as a companion to other food items, as a gourmet snack food, as a novelty food, and for preparing unusual sandwiches.

Having thus summarized the invention, it will be seen that an object thereof is to provide a pizza ersatz food product and process of the general character described herein.

Specifically, it is an object of the instant invention to provide a process for making a bread product in the form of a pizza analog.

A further object of this invention is to provide a process for making a pizza bread product from a dough having as a constituent ingredient a tomato based formula having flavoring for thorough integration and homogeneous distribution in a baked product.

An additional object of this invention is to provide a method for making a pizza food product confining therein an area of high concentration flavor intensifier.

A still further object of this invention is to provide a process for making a pizza food product which separately incorporates a surface coating of a flowable cheese composition contained within a confined area on the bread.

The above and other objects, features and advantages of this invention will be apparent from the following description of the preferred embodiment when considered in connection with the accompanying drawings.

BRIEF DESCRIPTION OF THE DRAWINGS

In the accompanying drawings in which is shown the preferred embodiment of this invention:

FIG. 4 is a perspective view of a scaled, shaped and proofed piece of dough and illustrates the incision within the upper surface;

FIG. 5 is a sectional view taken along line 5—5 of FIG. 4 and shows typically the depth of the incision and the elevation contours of the adjacent dough banks;

FIG. 6 is a sectional view similar to that of FIG. 5 and details the dough after receiving a charge of stabilized flavor intensifier;

FIG. 7 is a sectional view corresponding to that shown in FIG. 6 after the bread loaf has been baked to approximately 80% of completion and indicates the extent of migration of the stabilized flavor ingredients and also the thin crust development around the periphery; and FIG. 8 is a pictorial representation of a typical single slice from the baked pizza bread loaf and shows the browned and set layer of flowable cheese composition on the upper bread surface.

DETAILED DESCRIPTION OF THE INVENTION

Figure 1:
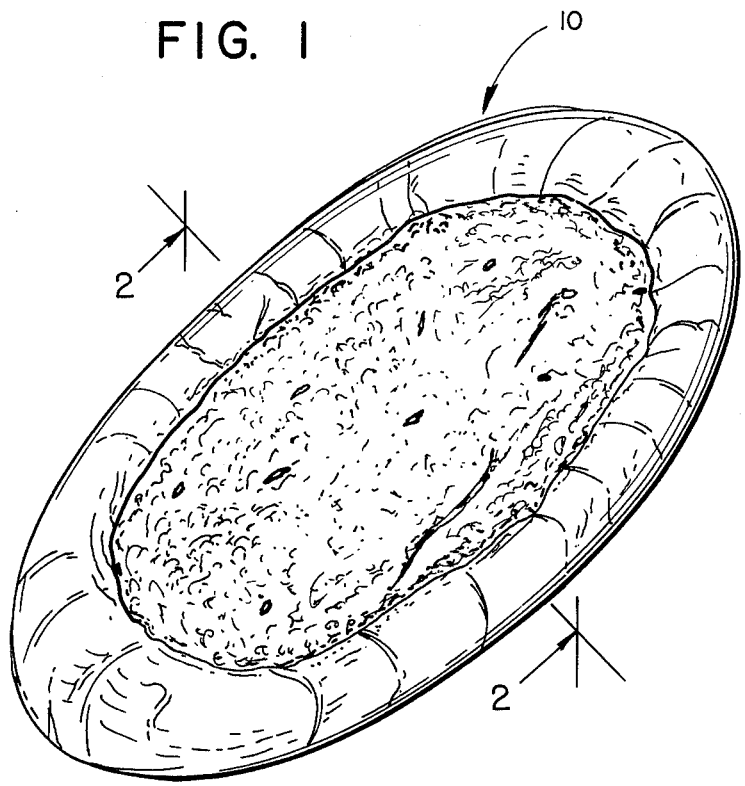
FIG. 1 is a pictorial representation of a pizza bread loaf as prepared in accordance with the process of this invention.

Referring now in detail to the drawings, the reference numeral 10 denotes generally the preferred embodiment of the pizza bread product of this invention.

Figure 2:
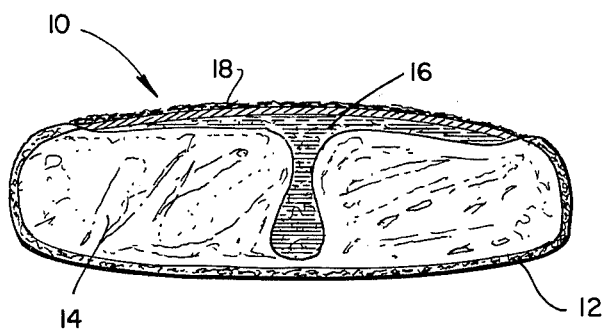
FIG. 2 is a typical sectional view taken substantially along line 2—2 of FIG. 1 and shows a well raised, even textured bread loaf including the interior portion which indicates the migration of the stabilized flavor intensifier and location of the flowable cheese composition.

The pizza bread 10 shown in FIG. 1 has a generally elongated shape and as baked is formed in a rather flattened bread loaf. As will be noted in the sectional view shown in FIG. 2, the interior of the bread 10 has a thin crust 12 extending around the periphery thereof and a generally homogeneously textured interior portion 14. The pizza bread 10 is made from a tomato based formula dough having pizza flavor ingredients which are uniformly distributed within the soft textured portion 14. Additionally, a charge of stabilized flavor intensifier 16 is included within a central area, corresponding generally to the initial place of introduction, and provides an area of high flavor concentration. As shown, some of the flavor intensifier 16 is also present on the upper surface area of the bread 10. FIG. 2 also illustrates in the baked pizza bread product 10 a surface lamina formed by a browned and set cheese composition 18. The bread product 10 just described provides a pizza substitute which combines a pizza flavor taste within a soft textured dough comfit.

Figure 3:
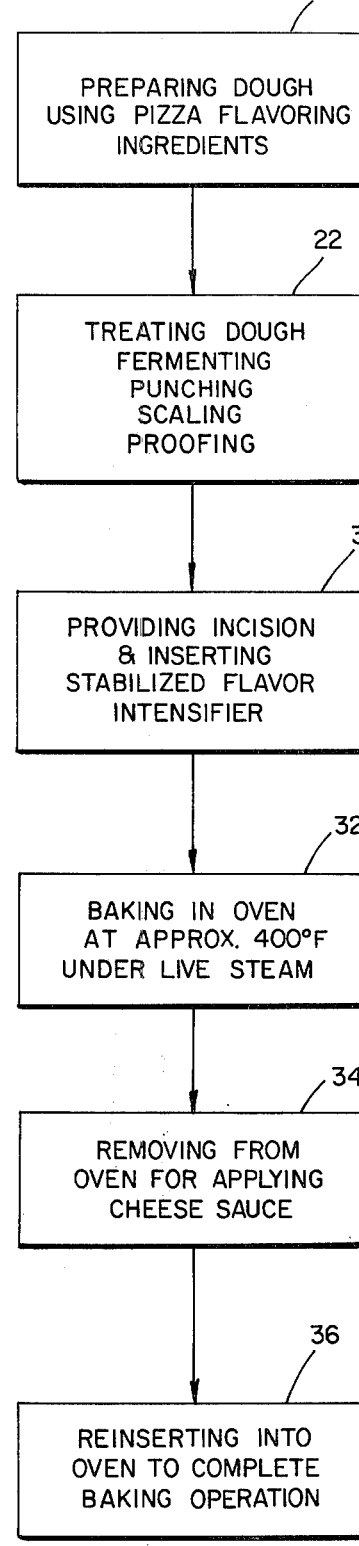
FIG. 3 is a flow diagram of the steps of this process for preparing a pizza bread product.

The process for making the bread product 10 of this invention is set forth in the flow chart diagram of FIG. 3 with particular reference to FIGS. 4 through 7. The method will be described in connection with commercial baking procedures, and a typical example will be set forth hereinafter indicating the constituent ingredients for producing 60 one pound soft bread loaves using the straight dough method. Modifications to the basic formula, as for making a crisp loaf or for making a white loaf, will also be discussed.

In regard to a preferred embodiment for a soft loaf, the constituent ingredients for preparing a tomato based formula dough having pizza flavor is set forth in Table 1 below which also specifies the quantity of each ingredient and the percentage thereof on a flour basis.

Table 1

| Ingredients | Amount | | Percentage on flour basis |
|---|---|---|---|
| flour (patent) | 10 lbs. | | 100.0 |
| flour (high gluten) | 2 lbs. | 9.5 ozs. | |
| ice water | 3 lbs. | 6 ozs. | 26.8 |
| yeast | 7 ozs. | | 3.5 |
| shortening | 6 ozs. | | 3.0 |
| sugar | 8 ozs. | | 4.0 |
| salt | 4 ozs. | | 2.0 |
| grated cheese | 5.5 ozs. | | 2.7 |
| oregano | 1 oz. | | 0.4 |
| tomato juice | 2 lbs. | | 36.7 |
| tomato paste | 2 lbs. | 10 ozs. | |

It should be noted that in the above Table 1 in place of the tomato paste an equivalent amount of nonartificial tomato puree, ketchup, ground pear tomatoes or tomato sauce may be substituted. Further, in addition to the ingredients as listed the following optional items can be included: yeast food (1 oz.) and an oxidation agent (6 ozs). Also a softener, an enrichment, a preservative and a vegetable coloring (preferably red) can be included in suitable quantities. In this connection, a variation to the basic formula of Table 1 above for providing a crisp loaf would be to omit the sugar and shortening and to increase the flour by 1 lb. 4 ozs.. Another version of the pizza bread form can be made by eliminating the tomato juice and paste or other tomato extract and food coloring to thereby produce a white loaf.

Referring now to the procedure for preparing a soft loaf, the initial step of this process is to prepare a tomato based formulation of pizza flavoring ingredients by adding the salt, sugar, shortening, yeast, grated cheese (preferably parmesan), and oregano to ice water. Additionally, as mentioned, a vegetable coloring (preferably red) can be included for esthetic purposes. The foregoing ingredients are scaled in a mixing bowl or other suitable vessel. The flour in the quantities indicated in Table 1 is then added to the previously prepared solution, and the tomato juice and paste are admixed just prior to initiating a mixing cycle. The mixing cycle is continued to effect a thorough development of the dough which will assume a smooth appearance. The mixing cycle will take approximately 45 minutes with the dough temperature rising to between 78° F and 84° F. This temperature will be a determining factor for terminating the mixing cycle. The temperature, however, varies because it is dependent upon the initial temperature of the ingredients, the room temperature, the ultimate time of mixing, and the friction induced by the mixing. Temperature control is important in order to prevent destruction of the yeast by extreme heat. The foregoing step is illustrated at 20 in the flow diagram of FIG. 3.

The dough is then removed from the mixing vessel and treated as indicated at 22 by allowing it to ferment or oxidize. Yeast activity during this fermentation period generates carbon dioxide gas resulting in an apparent increase in the volume of the dough. In order to release this carbon dioxide gas, the dough is periodically punched or beat down and folded by hand to expel the gas and introduce fresh oxygen. The fermentation period and punching process continues for about 1½ hrs. Typically, the punching procedure is spaced in time to initially begin after about 50% of the fermentation has been completed, i.e., after about 45 minutes, and secondarily after another 30% has elapsed. The final punching operation is conducted in the last remaining 10% of the fermentation period. This time is also used for scaling or dividing the dough into the desired pieces for shaping and subsequent baking into bread loaves. The pieces of dough so separated are then rounded so as to effect a smooth skin which is effected by the chemical processes within the dough. The rounded pieces of dough are then relaxed and molded into loaves approximately 18 inches in length and placed in bread pans for proofing. The dough is allowed to expand to its ultimate size with allowance for shrinkage during baking taken into consideration. In accordance with the process of this invention, the proofing is slightly less than normal to produce the desired result. A final proofing of the dough is conducted in a steam chamber having a temperature of approximately 96° F. and a 90% humidity. The dough is allowed to remain in the steam chamber for about 10 minutes. After removal, an incision 24 is made along the upper surface of a proofed piece of dough 26. As noted in the sectional view of FIG. 5, the incision 24 extends partially through the proofed dough 26 forming a V-shaped slot. Furthermore, the upper surface of the proofed dough 26 is contoured so as to slope gradually toward the incision 24 with the outer surface boundary providing a shoulder 28 for containment of a liquefied charge of stabilized flavor intensifier 16. The flavor intensifier 16 is inserted within the incision 24 as noted at step 30 in FIG. 3 and will be contained within the bounds defined by the shoulder 28.

The charge of flavor intensifier 16 is prepared from the ingredients listed in Table 2 below.

Table 2

| Ingredients | Amounts |
| --- | --- |
| Tomato paste | 7 lbs. |
| ground whole pear tomatoes | 7 lbs. |
| tomato juice | 7 lbs. |
| water | 14 lbs. |
| cornstarch (stabilizer) | 4 lbs. |
| salad oil | 2 lbs. |
| oregano | 2.5 ozs. |
| salt | 4 ozs. |
| pepper (black) | .25 ozs. |
| garlic salt | .25 ozs. |

The formulation is prepared by scaling the ingredients as set forth and by mixing same in the water. The salad oil used is preferably a corn or cottonseed oil; this oil ingredient will provide a soft moist texture to the charge of flavor intensifier 16 in the baked bread 10. Additionally, a suitable preservative and a vegetable coloring can optionally be included. The cornstarch ingredient acts as a stabilizer to provide the viscous consistency necessary to preclude surface runoff and to effect the desired expansion or limited migration into the dough during the baking procedure. It should be noted that the dough formulation provides for a tighter or stiffer dough for supporting the incision 24 and holding the flavor intensifier.

The dough 26 is then placed in an oven maintained at a temperature of between 375° F. and 425° F. for a duration of approximately 25 minutes. During the initial baking process live wet steam is injected into the oven under pressure of about 5 lbs./sq. inch and at a temperature equal to the baking temperature. This step is noted at 32 of FIG. 3. The live steam provides for controlled development of a thin uniform crust 12.

The dough 26 is removed from the oven after approximately 80% completion of the baking time or after 20 minutes. A flowable cheese composition 18 is applied to the surface of the dough 26 as noted at step 34. The cheese composition is prepared using the following ingredients indicated in Table 3 below.

Table 3

| Ingredients | Amounts |
| --- | --- |
| Grated cheese (parmesan) | 20 lbs. |
| mozzarella cheese (shredded) | 5 lbs. |
| oregano | .25 ozs. |
| parsley flakes | 5 ozs. |

Further reference to FIG. 7 indicates that the flavor intensifier 16 has migrated within the dough 26 and the incision 24 has effectively sealed itself.

The dough 26 is then reinserted into the oven to complete the baking operation as noted at step 36. The oven is maintained at the same temperature, however the live steam is discontinued. The dough 26 is allowed to remain within the oven for approximately ten minutes or until the cheese composition browns and sets forming a lamina 18. The baked dough 26 is then removed and allowed to cool for eight hours before being wrapped.

As previously noted, the bread can thus be packaged and sold as fresh loaves or alternatively frozen for future sale or use. Additionally, it has been found that with the use of conventional preservatives and effective sanitary procedures in the baking process the bread 10 will have a shelf life of approximately 10 days. In this connection, the procedure for effecting cleanliness during the operation involves the scrubbing of all equipment and pans, which is particularly important because the tomato ingredients spoil quickly and can contaminate the entire baking operation. Additionally, a parchment paper has been found to be effective when used as a lining for the baking pans in place of other forms of antisticking products. This parchment paper however should be replaced after each set up or after each baking cycle. The pans additionally should be washed in water at 100° E. and kept in a sterile environment until used.

FIG. 8 illustrates a typical slice of bread 10 having a soft textured interior portion 14 of thoroughly integrated tomato based formula dough having pizza flavor ingredients and a thin uniform crust 12. Additionally, this slice and every other slice cut from the bread 10 will have a portion of the flavor intensifier 16 and cheese composition 18. It should be apparent that a typical slice of bread 10 can be used for making a sandwich, can be eaten as a gourmet snack food by itself, can be used as the basis for a meal or can be used to complement other foods such as sandwich spreads.

The pizza bread product 10 in accordance with the present invention is particularly suitable for consumption in a freshly prepared state with or without further reheating.

It should also be observed that although the bread 10 is illustrated in the configuration of a loaf, the bread product can be formed or molded in the dough stages to form a roll, bagel, bun or other selected shaped item as will be apparent to those skilled in the art.

As other possible embodiments of the present invention and various changes might be incorporated by those skilled in the art without departing from the spirit of the invention, it should be understood that the invention is not limited to what is described in the specification and should not be interpreted in a limiting sense.

Having thus described the invention, there is claimed as new and desired to be secured by Letters Patent:

1. A method for making a pizza flavored food product in the form of a bread analog comprising the steps of preparing a dough having a homogeneously distributed mixture of a tomato based formulation of flavoring ingredients, allowing the dough to ferment, releasing the gases formed during said fermentation, scaling the dough into desired shapes, proofing the dough, providing an incision penetrating an upper surface and extending interiorly into the dough, placing a liquefied charge of stabilized flavor intensifier into the incision, baking the dough in an oven for partial sealing of the incision and limited migration of the flavor intensifier to provide an included area having a soft moist texture, removing the dough from the oven prior to completion of the baking procedure, applying a flowable cheese sauce composition to the upper surface of the dough, reinserting the dough into the oven to complete the baking procedure wherein the sauce composition sets to form a surface lamina.

2. A method for making a pizza bread analog as claimed in claim 1 wherein the incision is in the form of a V-shaped slot and the upper surface of the dough is contoured to slope toward the incision with an outer dough boundary providing a peripheral shoulder for containment of the liquefied charge of stabilized intensifier and flowable sauce composition.

3. A method for making a pizza bread analog as claimed in claim 2 further including the step of proofing the dough in a steam chamber prior to providing the incision.

4. A method for making a pizza bread analog as claimed in claim 3 wherein the initial baking procedure is conducted under live wet steam injected into the oven under pressure for controlled development of a thin uniform crust.

5. A method for making a pizza bread analog as claimed in claim 4 wherein the baking procedure is completed by reinserting the dough into the oven and discontinuing the injection of live wet steam to permit the sauce composition to set.

6. A method for making a pizza bread analog as claimed in claim 5 wherein the dough is baked during the initial and final baking procedure in an oven at a temperature range of between 375° F. and 425° F.

7. A method for making a pizza bread analog as claimed in claim 6 wherein the charge of flavor intensifier includes a nonartificial tomato extract, and the flowable sauce composition includes a seasoned cheese preparation.

* * * * *